United States Patent [19]

Chalmers

[11] 4,435,990
[45] Mar. 13, 1984

[54] POWER TAKE OFF GEAR BOX

[76] Inventor: Samuel A. Chalmers, 8141 E. 48th, Tulsa, Okla. 74145

[21] Appl. No.: 186,127

[22] Filed: Sep. 11, 1980

[51] Int. Cl.³ ...................... F16H 37/00; F16D 25/04
[52] U.S. Cl. .................................... 74/15.63; 74/413; 192/88 A
[58] Field of Search ................... 74/15.2, 15.6, 15.63, 74/15.8, 413; 192/88 A; 308/18

[56] References Cited

U.S. PATENT DOCUMENTS

| | | | |
|---|---|---|---|
| 2,214,170 | 9/1940 | Tourneau | 74/15.6 |
| 2,512,360 | 6/1950 | McLean | 192/88 A |
| 2,975,643 | 3/1961 | Ferguson | 74/15.2 |
| 3,118,311 | 1/1964 | Francis | 474/201 |
| 3,447,393 | 6/1969 | Wiseman et al. | 74/15.2 |
| 3,561,277 | 2/1971 | Boyle et al. | 74/413 |
| 3,698,524 | 10/1972 | Schubert | 74/15.63 |
| 4,228,880 | 10/1980 | Gee | 192/82 T X |
| 4,282,960 | 8/1981 | Glasson et al. | 192/82 T X |
| 4,295,553 | 10/1981 | Sayo et al. | 192/84 C |
| 4,301,906 | 11/1981 | Shirai | 192/84 C |

FOREIGN PATENT DOCUMENTS 271183 6/1927 United Kingdom .

638772 12/1978 U.S.S.R. ....................... 74/413

*Primary Examiner*—Rodney H. Bonck
*Attorney, Agent, or Firm*—Head, Johnson & Stevenson

[57] ABSTRACT

A portable power take off gear box assembly of a relatively short overall length to provide a short coupling distance between a drive source and a driven source and comprising a clutch mechanism interposed between the drive shaft of the drive source and a rotatable input shaft of the gear box assembly, a rotatable output shaft having the longitudinal axis thereof disposed in substantial vertical planar alignment with the longitudinal axis of the drive shaft, a gear train interposed between the input shaft and the output shaft for transmitting rotation to the output shaft, the relative position of the input shaft and output shaft providing ease of forward and reverse directions of rotation for the output shaft, a drive sheave in driving connection between the output shaft and the drive source for actuation of the driven source, the output shaft being supported by an outboard bearing assembly disposed in substantial alignment with the drive sheave to permit side loading of the gear box, and an internal independent lubricating system provided for the gear box assembly.

6 Claims, 6 Drawing Figures

POWER TAKE OFF GEAR BOX

BACKGROUND OF THE INVENTION

1. Field of the Invention

This invention relates to improvements in power take off gear box assemblies and more particularly, but not by way of limitation, to a portable power take off gear box of a relatively short length and of a light weight for providing a short coupling between a drive source and a driven source.

2. Description of the Prior Art

Power take off gear box assemblies are widely used for transmitting power from a drive source to a driven source. For example it is common practice to connect the drive shaft of an industrial engine with a mud pump, or the like, in a well bore drilling operation in the oil and/or gas drilling industry. At the present time, the usual method of connection between the engine and the pump requires a considerable length of spacing between the engine and the pump, and the presently available gear box units have many disadvantages in that there is considerable twisting or torque and other forces transmitted to the gear box which are undesirable. The great distance required between the engine and the pump is also undesirable in that this greatly limits the use of this equipment in off-shore drilling rigs, and the like. It will be readily apparent that this disadvantage is of considerable importance in the light of the present day energy shortage and extensive activity in off-shore drilling operation.

SUMMARY OF THE INVENTION

The present invention contemplates a novel power take off gear box assembly particularly designed and constructed to overcome the foregoing disadvantage. The arrangement of elements in the novel gear box permits a relatively short overall length for the unit thereby providing a short coupling between the engine and the pump unit. In addition, the output shaft of the gear box has been particularly disposed in relation to the input shaft thereof for providing ease of providing forward and reverse directions of rotation for the output shaft by merely removing an idler gear from the drive gear train to change the direction of rotation of the output shaft. The input shaft of the gear box is operably connected with the drive shaft of the engine, or the like, through a suitable clutch mechanism, for example an air clutch means, for transmitting rotation to the input shaft, and the drive gear train transmits rotation from the input shaft to the output shaft. The output shaft is operably connected with the pump unit, or the like, through a drive sheave and belt assembly, and the support bearing for the output shaft is mounted outboard in a position of substantial alignment with the drive sheave to compensate for side loading of the apparatus. In addition, the longitudinal axis of the output shaft is in substantial planar alignment with the mounting pads of the support bearing which restricts overturning of the output shaft. An internal lubrication system is provided for the gear box to facilitate maintenance thereof and prolong the useful life thereof. The novel power take off gear box assembly is simple and efficient in operation and economical and durable in construction.

BRIEF DESCRIPTION OF THE DRAWINGS

FIG. 6 is a sectional view, partly in elevation showing a lubrication pump drive mechanism utilized in the invention.

DETAILED DESCRIPTION OF THE PREFERRED EMBODIMENT

Figure 1:
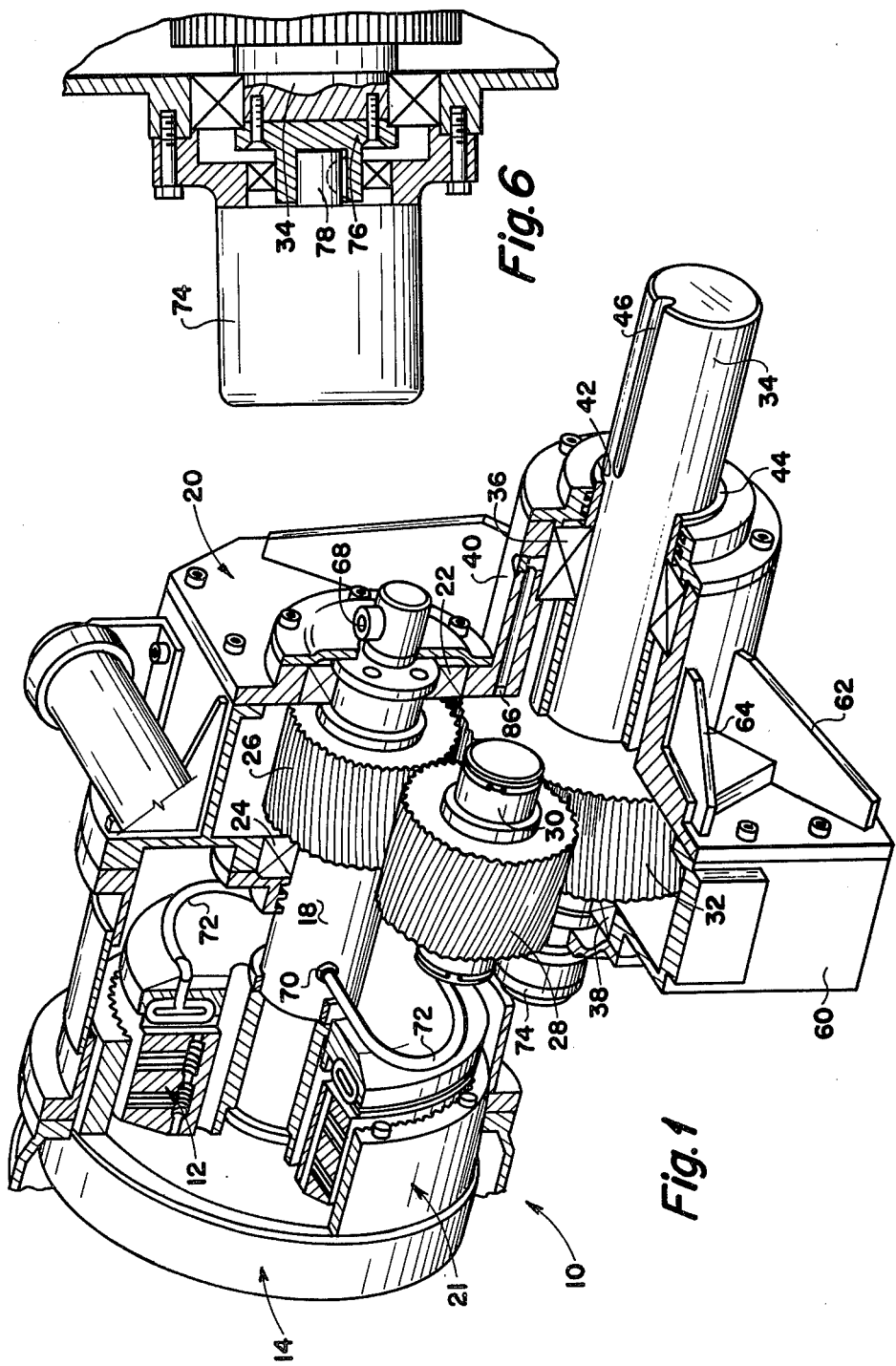
FIG. 1 is perspective view, partly in section, of a power take off gear box embodying the invention.

Referring to the drawings in detail, reference character 10 generally indicates a power take off gear assembly comprising a suitable clutch mechanism 12 which is operably connected between a drive mechanism 14 of a suitable power supply 16 and a rotatable input shaft 18 of the gear box assembly 10. The power supply 16 may be any suitable device, and as shown herein is preferably an industrial engine as commonly utilized at the site of a well bore drilling operation. In addition, the clutch assembly 12 may be of any well known type, but as shown herein is an air clutch which is particularly advantageous for utilization at the site of a well bore drilling operation since there is usually a great quantity or adequate supply of air available at these drilling operations. The input shaft 18 may be supported in a suitable sectional gear box housing generally indicated at 20 by a pair of spaced bearings 22 and 24 which are mounted within the housing 20 in any suitable or well known manner. The housing 20 may be bolted or otherwise secured to a clutch housing 21 as is well known. The input shaft 18 extends longitudinally through or is suitably connected with the clutch assembly 12 for actuation thereby whereby the shaft 18 will be rotated about its longitudinal axis upon rotation of the drive mechanism 14.

A first gear member 26 is keyed or otherwise secured to the outer periphery of the input shaft 18 for rotation simultaneously therewith, and is in meshing engagement with an idler gear 28 which is suitably journalled on a stub shaft 30, or the like, which is mounted in the housing 20 in any well known manner (not shown). The idler gear 28 is in meshing engagement with a driving gear 32 which is keyed or otherwise secured around the outer periphery of an output shaft 34 which is rotatably supported by a pair of spaced bearings 36 and 38. The bearing 38 may be disposed within the housing 20 as particularly shown in FIG. 1, and the bearing 36 is preferably disposed in an outwardly extending boss or sleeve member 40 whereby the bearing 36 is outboard of the housing 20 for a purpose as will be hereinafter set forth.

The output shaft 34 is disposed in spaced relation with respect to the input shaft 18, and is preferably disposed in such a manner that the longitudinal axis thereof is in substantial vertical planar alignment with the longitudinal axis of the shaft 18. In this manner, when it is desirable that the rotational direction of the shaft 34 be in the same or a common direction of rotation with the rotation of the shaft 18, the rotation may be translated from the shaft 18 to the shaft 34 through the gear train 26-28-32, as shown in FIG. 1. In the event it is desirable that the direction of rotation of the shaft 34 be in a reverse direction with respect to the direction of rotation of the shaft 18, the idler gear 28 may be omitted and the gears 26 and 32 may be selected of a suitable size ratio to provide a meshing engagement therebetween. Thus, the gear box assembly 10 may be readily adapted for a forward or reverse direction of rotation of the output shaft 34 by merely eliminating the idler gear, or utilizing the idler gear, as desired.

Figure 2:
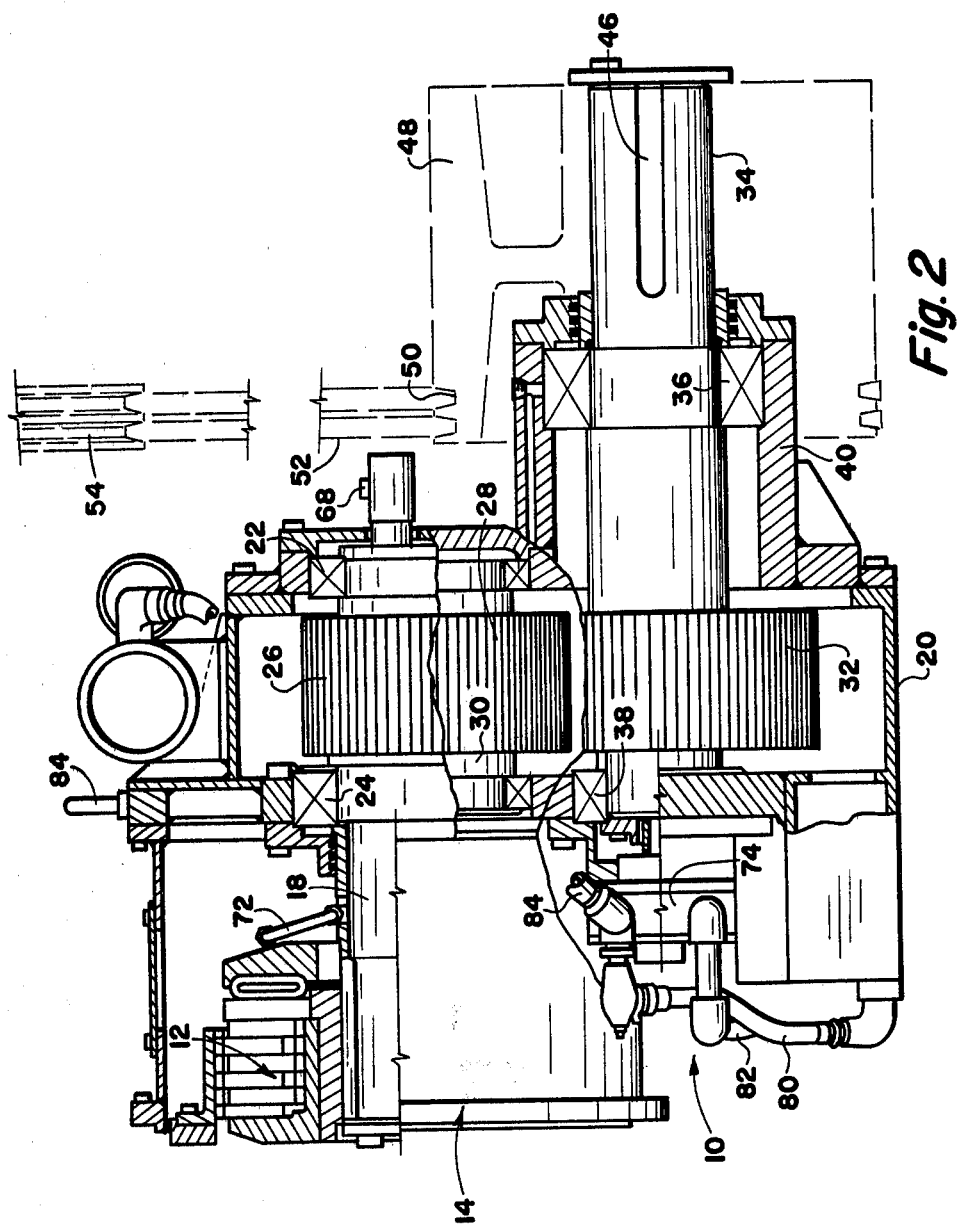
FIG. 2 is a sectional elevational view of a power take off gear box embodying the invention, with portions depicted in broken lines for purposes of illustration.
Figure 3:
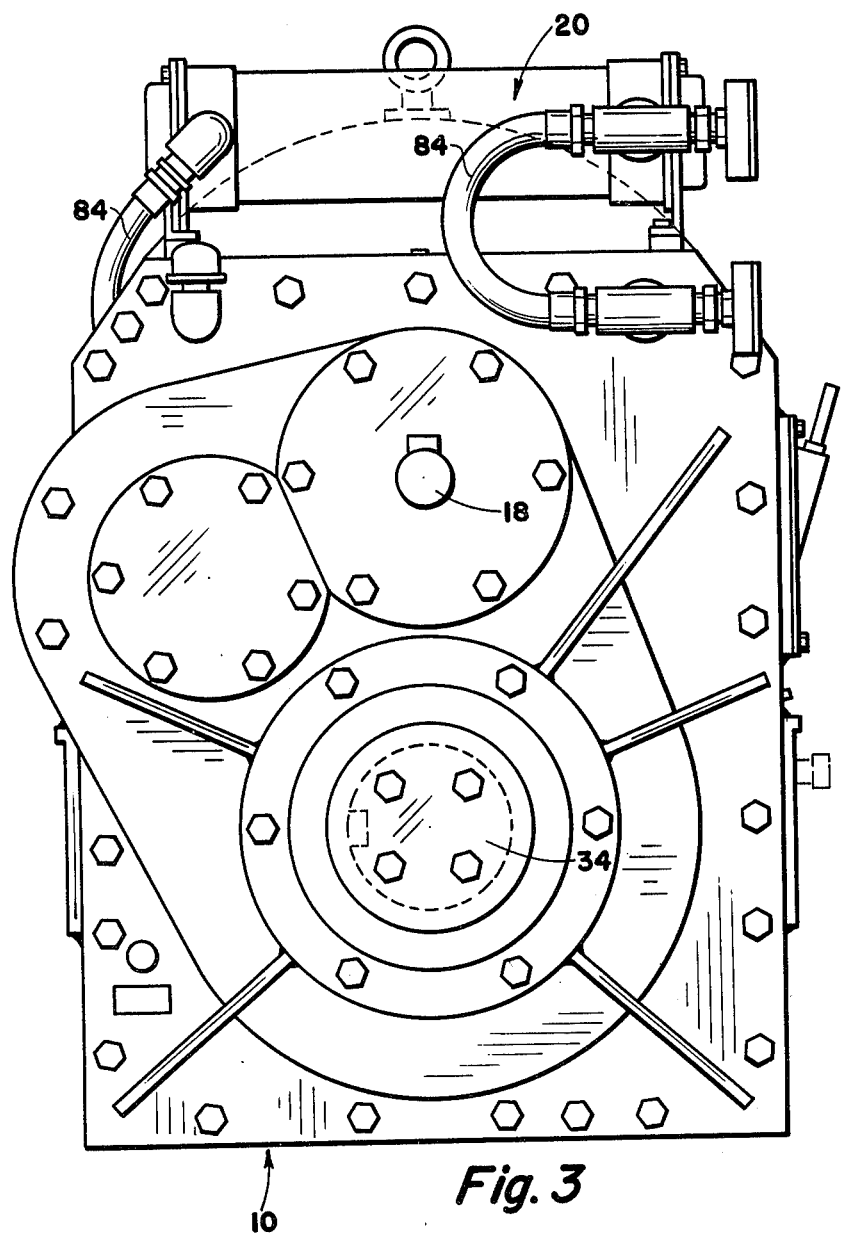
FIG. 3 is an elevational view of the output end of a power take off gear box embodying the invention.
Figure 5:
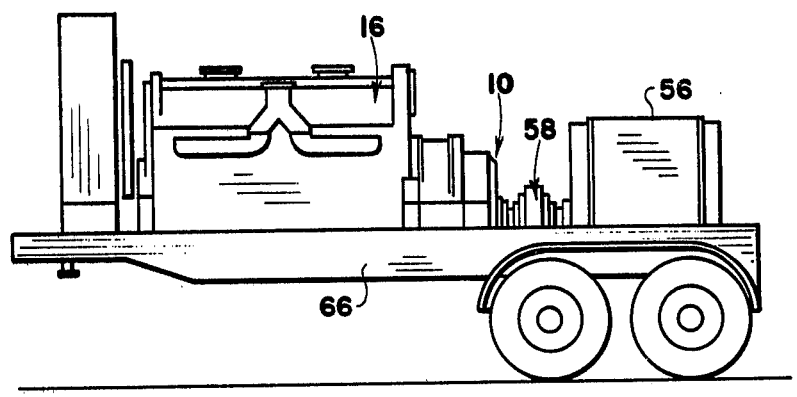
FIG. 5 is a side elevational view of a trailer unit having a power take off gear box embodying the invention mounted thereon and operably connected between a drive engine and a driven pump unit.
Figure 4:
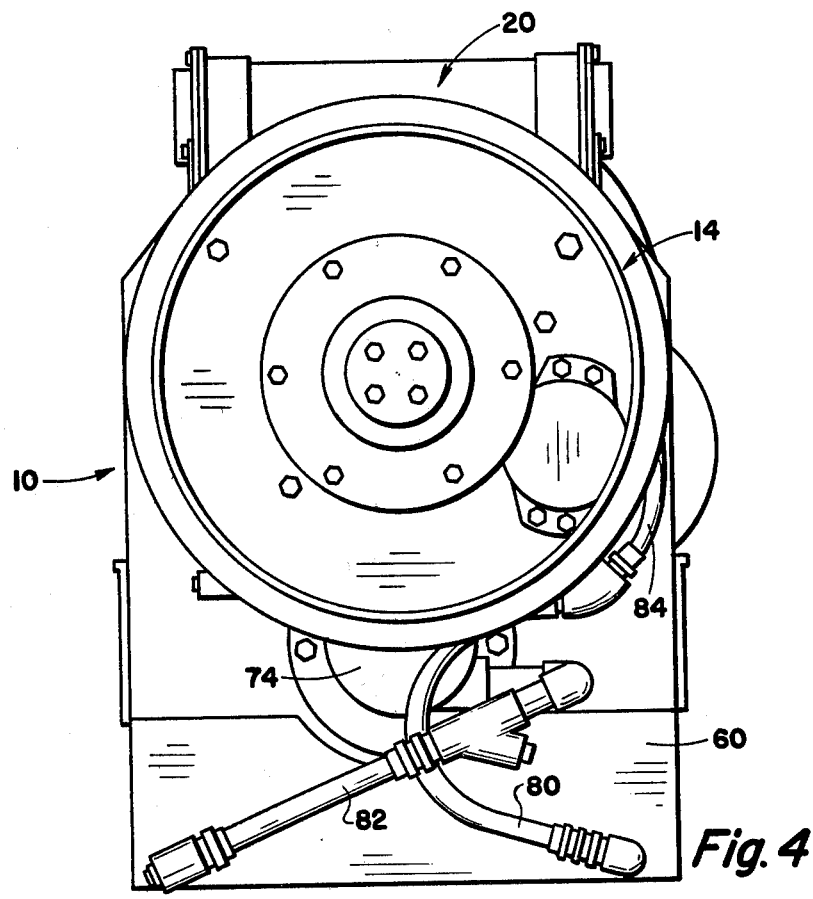
FIG. 4 is an elevational view of the intake end of a power take off gear box embodying the invention.

The outer end of the output shaft 34 extends axially outwardly from the boss or sleeve 40 through a bore 42, and a suitable bushing or seal member 44 is preferably interposed between the bore 42 and outer periphery of the shaft 34 for facilitating rotation of the shaft and precluding leakage of fluid therebetween. The outer end of the shaft 34 is preferably splined, as shown at 46 in FIG. 1 for receiving a suitable hub or spider member 48 thereon, as shown in broken lines in FIG. 2. The hub 48 is in splined connection with the shaft 34 for rotation simultaneously therewith, and is so positioned on the shaft 34 whereby the inner end thereof extends to and slightly beyond the bearing 36, as will be particularly seen in FIG. 2. A plurality of chain or belt receiving grooves 50 are provided around the outer periphery of the hub 48 and disposed in substantial planar alignment with the bearing 36. A suitable chain or belt means 52 is disposed in the grooves 50 and extend around the outer periphery of the hub 48 and to and around a suitable drive sheave means 54 for transmitting selective rotation to the sheave 54 for a purpose and in a manner as will be hereinafter set forth. The sheave means 54 may be suitably connected with a driven means 56, such as a mud pump, or the like, utilized in a well bore drilling operation, for actuation thereof as required. An alternate drive means 58 (FIG. 5) may be directly connected between the output shaft 34 and the driven means 56, if desired, to drive the pump 56 by a direct coupling therewith, if desired.

A drop box housing means 60 is provided on the housing 30 for encasing the lower portion of the gear 32, as particularly shown in FIG. 1, and suitable mounting pads 62 and 64 for facilitating mounting of the gear box assembly 10 on a movable trailer 66, skid unit (not shown), or the like. It is preferable to position the output shaft 34 in such a manner that the longitudinal axis thereof is in substantial horizontal planar alignment with the mounting pad 64, thus compensating for any side loading during operation of the assembly 10.

The input shaft 18 is preferably provided with a longitudinally extending internal passageway (not shown) providing communication between an air inlet port 68 and an air outlet port 70. Suitable conduit means is secured between the air outlet port 70 and the clutch mechanism 12 in any suitable or well known manner for supplying air to the clutch for actuation thereof. The usually abundant air supply normally present at a well bore drilling site may be directed into the air inlet port 68 in any well known manner for supplying the activating source for the clutch mechanism 12 for control of the rotation of the input shaft 18 for a purpose as will be hereinafter set forth.

A suitable oil pump means 74 may be secured to the housing 20 in any suitable manner (not shown) and may be operably connected with the inner end of the output shaft 34 in any well known manner, such as by a flange member 76 (FIG. 6) bolted or otherwise secured to the inner end of the output shaft 34 for receiving the drive shaft 78 of the pump 74 therein. The flange member 76 may be operably connected with the shaft 78 by a suitable splined connection (not shown), or the like, whereby rotation of the flange 76 simultaneously with the output shaft 34 will transmit rotation of the shaft 78 for actuation of the fluid pump 74. The pump 74 is in communication with the interior of the housing 20 through a suitable fluid conduit 80, and a suitable drain conduit 82 is operably connected with the pump 74 for discharge of fluid therefrom when required. Each of the bearings of the gear box unit 10 is provided with a direct connection with the lubricating fluid (not shown) through suitable conduits 84, and internal passageways, such as shown at 86 in FIG. 1. Of course, it is preferable to provide a suitable lubricating fluid within the gear box housing 20 for circulation through the system by the pump 74 as is well known, thus providing an independent internal self-contained lubricating system for the gear box assembly 10. Of course, it is preferable to provide suitable sealing means (not shown) between the interior of the gear box housing 20 and the interior of the clutch housing 21 for precluding engagement of the lubricating fluid with the clutch mechanism 12.

In operation, the clutch mechanism 12 may be selectively engaged by the control of the application of the air supply thereto in the usual or well known manner. Thus, when it is desirable to transmit driving power from the driver or engine 16 to the driven apparatus or pump 56, the clutch mechanism 12 may be engaged for transmitting rotation to the input shaft 18. The shaft 18 transmits rotation to the input gear 26 which transmits rotation to the output shaft 34 through the output gear 32. In the event it is desirable to provide a reverse direction of rotation for the shaft 34 with respect to the shaft 18, a direct meshing engagement may be provided between the input gear 26 and output gear 32. In the event it is desirable to provide a common direction of rotation for the shafts 18 and 34, the idler gear 28 may be interposed between the gears 26 and 32 whereby the rotation of the gear 26 is transmitted to the gear 32 through the idler 28.

The output shaft 34 transmit rotation to the hub or spider 48 for rotating the drive sheave 54 through the belt meant 52. The rotation of the sheave 54 is transmitted to the drive shaft or input shaft means of the pump unit 56 for driving of the pump in the usual manner. The overall length of the gear box assembly 10 is relatively short, thus greatly reducing the space requirements between the engine 16 and pump 56 for the driving apparatus therebetween. The reduced length for the assembly 10 also reduces the overall weight of the assembly 10 thus greatly facilitating portability of the apparatus 10. As a result the engine 16, power take off gear box assembly 10 and mud pump unit 56 may be mounted on a common carrier, such as the trailer 66 for ready transport from site to site as required during well drilling operations, and the like.

The novel positioning arrangement between the output shaft 34 and input shaft 18 permits the utilization of a gear train in a manner whereby either forward or reverse directions or rotation may be provided for the output shaft. The outboard position of the output shaft bearing provides for an orientation between the bearing and the drive sheave for compensation of side loading of the apparatus during utilization thereof. The drop-type positioning or construction for the housing portion 60 which permits placing of the mounting pads in alignment with the longitudinal axis of the output shaft for substantially precluding overturning of the output shaft, and the independent internal lubricating system of the assembly 10 greatly prolongs the useful life of the apparatus with a minimum of maintenance.

From the foregoing it will be apparent that the present invention provide a novel power take off gear assembly of a considerably shorter length than presently available devices of this type, which results in a greatly reduced weight for the assembly to facilitate transporting thereof. The shorter overall length of the assembly also reduces the space requirements for utilization of the assembly between a drive unit and a driven unit. The operation of the gear box assembly may be easily accomplished from a remote location since the operation thereof is direct and simple and the lubricating thereof reduces maintenance and the attendance of operating personnel.

Whereas the present invention has been described in particular relation to the drawings attached hereto, it should be understood that other and further modifications, apart from those shown or suggested herein may be made within the spirit and scope of this invention.

What is claimed is:

1. A power take off gear box assembly for transmitting power between a drive source and a driven source and comprising rotatable input shaft means, clutch means operably connected between the drive source and input shaft means for transmitting rotation to the input shaft means, rotatable permanent output shaft means having the longitudinal axis thereof disposed in substantial vertical planar alignment with the longitudinal axis of the input shaft means, gear train means interposed between the input shaft means and output shaft means for transmitting rotation to the output shaft means, the relative position between the input shaft means and output shaft means providing for ease of forward and reverse directions of rotation for the output shaft means, housing means encasing the gear train means, independent self-contained lubricating means operably secured to the output shaft means and in communication with the interior of the housing means for providing internal lubrication surrounding the gear train means for facilitating maintenance of the gear box assembly, and wherein the housing means encasing the gear train means includes drop box means having mounting pad means carried thereby and disposed in substantial horizontal planar alignment with the longitudinal axis of the output shaft means to compensate for side loading forces during operation of the power take off gear box assembly.

2. A power take off gear box assembly as set forth in claim 1 wherein the gear box assembly is of a minimum overall length for reducing space requirements between the drive source and driven source.

3. A power take off gear box assembly as set forth in claim 2 wherein the gear box assembly is of a reduced overall weight to facilitate transporting thereof.

4. A power take off gear box assembly as set forth in claim 1 and including bearing means supporting the output shaft means, hub means disposed around the outer periphery of the output shaft means for rotation simultaneously therewith, drive sheave means operably connected with the driven source for actuation thereof, endless belt means extending around and between the drive sheave means and hub means for transmitting rotation to the drive sheave means, the drive sheave means being disposed in substantial planar alignment with the bearing means for compensation of side loading forces.

5. A power take off gear box assembly as set forth in claim 1 wherein the drive source is an industrial engine, the driven source is a pump unit, and the clutch means is an air clutch.

6. A power take off gear box assembly as set forth in claim 5 wherein air pressure is directed to the clutch means through the input shaft means.

* * * * *